(12) United States Patent
Bortolussi et al.

(10) Patent No.: US 10,136,589 B2
(45) Date of Patent: Nov. 27, 2018

(54) DEVICE FOR FASTENING AND ADJUSTING THE CARRYING WIRES ON A ROW OF PLANTS

(71) Applicants: Claudio Bortolussi, Fiume Veneto (IT); Franco Bortolussi, Fiume Veneto (IT)

(72) Inventors: Claudio Bortolussi, Fiume Veneto (IT); Franco Bortolussi, Fiume Veneto (IT)

(*) Notice: Subject to any disclaimer, the term of this patent is extended or adjusted under 35 U.S.C. 154(b) by 310 days.

(21) Appl. No.: 14/784,804

(22) PCT Filed: Apr. 17, 2014

(86) PCT No.: PCT/IB2014/060807
§ 371 (c)(1),
(2) Date: Oct. 15, 2015

(87) PCT Pub. No.: WO2014/174417
PCT Pub. Date: Oct. 30, 2014

(65) Prior Publication Data
US 2016/0073593 A1    Mar. 17, 2016

(30) Foreign Application Priority Data

Apr. 24, 2013 (IT) .............................. PN2013A0022

(51) Int. Cl.
| | |
|---|---|
| *A01G 17/00* | (2006.01) |
| *A01G 17/14* | (2006.01) |
| *A01G 17/06* | (2006.01) |

(52) U.S. Cl.
CPC ............. *A01G 17/14* (2013.01); *A01G 17/06* (2013.01); *A01G 2017/065* (2013.01)

(58) Field of Classification Search
CPC ........ A01G 17/00; A01G 17/02; A01G 17/04; A01G 2017/065; A01G 17/14
See application file for complete search history.

(56) References Cited

U.S. PATENT DOCUMENTS

| | | | |
|---|---|---|---|
| 6,449,898 B1 * | 9/2002 | Alban | A01G 17/00 47/58.1 FV |
| 7,571,567 B2 * | 8/2009 | Bortolussi | A01G 17/06 47/46 |
| 7,818,915 B1 * | 10/2010 | Flaishman | A01G 17/00 47/1.43 |
| 9,717,189 B2 * | 8/2017 | Sowinski | A01G 17/06 |

(Continued)

FOREIGN PATENT DOCUMENTS

| | | |
|---|---|---|
| EP | 1 230 839 A1 | 8/2002 |
| WO | 2005/048691 A2 | 6/2005 |
| WO | 2007/060225 A1 | 5/2007 |

(Continued)

OTHER PUBLICATIONS

Dec. 2, 2014 International Search Report issued in International Patent Application No. PCT/IB2014/060807.

(Continued)

*Primary Examiner* — Monica L Williams
*Assistant Examiner* — Aaron M Rodziwicz
(74) *Attorney, Agent, or Firm* — Oliff PLC

(57) ABSTRACT

A device for fastening and adjusting the carrying wires on a row of plants, such as a vineyard, and in particular to support and manage the row of plants, so as to make both manual and mechanized operations simpler and more functional.

8 Claims, 4 Drawing Sheets

(56) References Cited

U.S. PATENT DOCUMENTS

2013/0042525 A1* 2/2013 Bortolussi ............. A01G 17/14
47/46

FOREIGN PATENT DOCUMENTS

| WO | 2011/131468 A1 | 10/2011 |
| WO | 2013/017706 A1 | 2/2013 |
| WO | 2013/079262 A1 | 6/2013 |

OTHER PUBLICATIONS

Dec. 2, 2014 Written Opinion of the International Searching Authority issued in International Patent Application No. PCT/IB2014/060807.

* cited by examiner

US 10,136,589 B2

DEVICE FOR FASTENING AND ADJUSTING THE CARRYING WIRES ON A ROW OF PLANTS

TECHNICAL FIELD OF THE INVENTION

The present invention is related to a device for fastening and adjusting carrying wires on a row of plants, such as a vineyard, and in particular means to support and manage the row of plants, so as to make both manual and mechanized operations simpler and more functional.

PRIOR ART TECHNIQUE

In the agricultural sector, and in particular in the viticultural field, a well-known practice is to provide plant support structures, structures consisting of rows of poles driven into the ground so as to form rows of plants. The poles are spaced at regular distances and are interconnected at a given height from the ground by means of at least one fixed horizontal wire, called or "training wire" or "carrying wire".

Further, on two poles, called "head poles" placed at the end of each row of plants, it is fastened at least a pair of wires parallel one to the other and arranged also on the respective sides of each pole of the row of plants itself. These wires are commonly called "movable containment wires", as during the different phases of plant cultivation they are moved to different heights from the ground in order to contain and organize the growing vegetation according to a desired configuration. This operation is particularly laborious and consists in manually positioning the containment wires at different heights hooking them at the hooks placed on the head pole and on the intermediate poles as the vegetation and the sprouts grow.

The application of European patent EP2560471, by the same holders, describes a device for fastening the "containment wires" of a row of plants, in particular grape vines, which provides for the connection of the containment wires to vertical guide means, associated to the end poles or to the head poles. The ends of the containment wires are fastened to mounting means that are inserted and can slide within the guides provided in the vertical guide means, so as to modify the height of the movable containment wires and to adapt it to the vegetation growth.

This solution is advantageous but it does not give, at a later phase, the possibility of optimizing the position of the first and that of a second and possibly of a third carrying wire, placed higher with respect to the carrying wire having a support function. Moreover, it does not solve the problem of shoot trimming after the grape harvest. In fact, this operation, carried out by automotive machines moving along the rows, has shortcomings as the carrying wires cannot be raised towards the upper end of the poles since the carrying wires are fastened at intermediate positions of the vertical length of the poles.

In order to solve this inconvenience and in order to make the carrying wires movable as well, it has been devised a guide and fastening device for carrying wires for plants as described in the Italian patent application PN 2011U000035 also by the same holders; such guide device is placed in front or at the back or directly on the head pole in order to be able to adjust the height not only of the pairs of containment wires fastened to the fastening means, consisting in sliding or rolling devices capable of sliding both inside and outside with respect to the same sliding guides, but as well as that of the carrying wires, they too connected to fastening means consisting in sliding devices inserted within the same guides.

Moreover, the guides have vertical dimensions whose extensions make it possible a limited management also of the containment wires fastened to the head poles of the rows of plants.

The system of the guides, since they develop transversally with respect to the direction of the row of plants, is moreover complex and strenuous and it is also an obstacle for the mechanized harvest as the machine operators have to be extremely careful not to bump into such guide system placed near the head poles. The guide system also provides for the necessity of being installed and always kept in a vertical position so as to prevent fastening means from moving inside the guides undergoing the wire tension.

A further shortcoming is represented by the fact that the head poles are usually wind braced by means of tie-rods, driven into and anchored to the ground in an oblique position with the scope of opposing the tension caused by the plant force and by the force of the tensioned wires so as to form the growth and containment trellis of the plants.

The tie-rods fastened to the head poles are fastened to an anchor obliquely driven into the ground provided at one end with an helix to penetrate into the ground, or tie-rod and plate, and so as to act, by means of its development surface, as a braking surface opposing the tractive force of the head pole forcing on the same ground where it has been driven. On the other end of said anchor there is usually an eyelet wherein the anchoring tie-rods of the head pole are caused to pass. The portion of space between the head poles and the anchor, wherein the tie-rods are, is not normally cultivated as there are not containment wires and carrying wires whereon sprouts and vegetation can grow, or, in case this part is cultivated, the vegetation management is carried out manually.

SUMMARY OF THE INVENTION

The main purpose of the present invention is that of providing a device for fastening and adjusting the wires supporting a row of plants, such as a vineyard, in order to make it possible to manage the entire cultivation system more rationally during the phases of growth, grape harvest and trimming.

A further object of the invention is that of having the possibility of increasing the vertical excursion of the containment wires so as to allow a greater flexibility in the plant management, avoiding the necessity of using sliding guides especially devised for and applied to the carrying wires of the row of plants.

Still another object of the invention is that of making it simpler and safer driving the head poles into the ground making the use of anchors optional and so as to have the possibility of using the end part of the row of plants to increase its cultivated surface.

These and other objects are reached through a device for fastening and adjusting the carrying wires on a row of plants, having the characteristics specified in the claims in the present patent.

SHORT DESCRIPTION OF FIGURES

Further characteristics and advantages of the device for fastening and adjusting carrying wires on a row of plants according to the invention will become more apparent from the following description of a form of embodiment by way of example and without limitation with reference to the appended figures wherein.

DETAILED DESCRIPTION OF THE INVENTION

The idea at the basis of the present invention is that of devising a device or a structure capable of simplifying the known complex structures both from the operational point of view and from the point of view of the dimensions. In particular the structures used at present require rather bulky guides which have somehow to be fastened to the head poles and have to ensure the vertical sliding of the containment wires with a suitable travel so as to cover the entire vertical development of a plant. Such requirement is particularly felt in the cultivation of grape vines.

As shown in FIGS. 1A-5A, the device of the invention is overall identified with the reference number 1. The device 1 comprises a pair of head poles PT, one for each end of the row (only the one for one end of the row is shown in the figures), a plurality of intermediate poles PI between which carrying wires FF are tensioned (which, if it is necessary, have the possibility of being raised or lowered if an open pole is used as a head pole) to support the shoots and its sprouts from which they develop annually, and containment FM and sprout straightening wires.

The head pole is a traditional pole made of concrete, reinforced concrete, wood, metal, fiberglass or other materials either open or closed. It is to note that this pole is embedded into the ground in a vertical position. Preferably, the head pole PT is an either open or closed stainless or galvanized hollow pole. Moreover, it comprises a plurality of seats 2 for anchoring the carrying wires FF. Preferably, these seats 2 are through holes wherein hooking means 3 of wires FF are engaged to the head poles PT.

Figure 6:
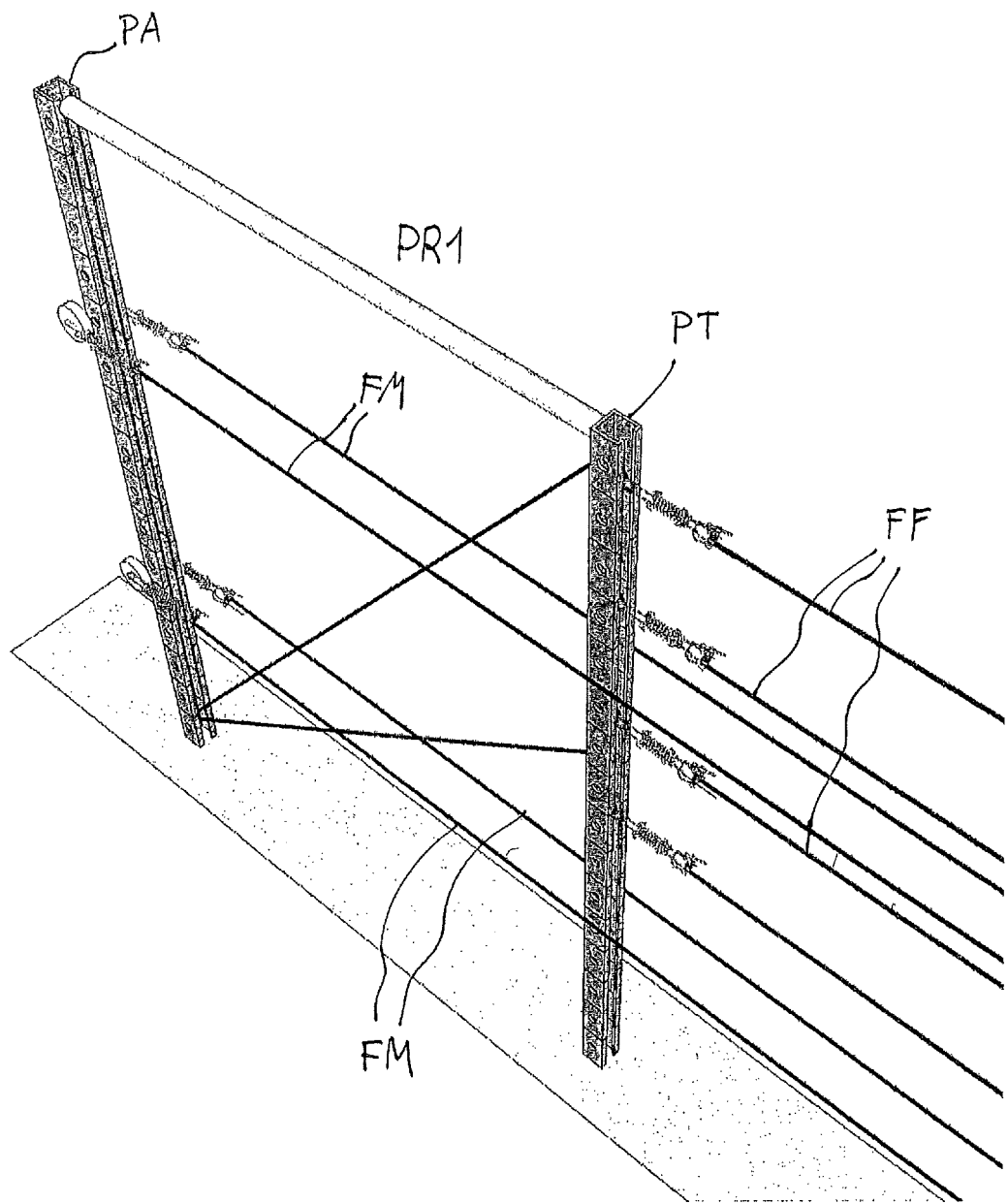
FIG. 6 is a schematic perspective top view of a head portion of a device for fastening and adjusting carrying wires on a row of plants according to a variant of the invention.

The open head pole may not have holes for fastening the carrying wires but it may be the guide for said wires which, therefore, can become movable, hooked to the head poles by means of the above said fastening means formed by devices or sliding means; in this way all the wires can easily be moved according to the operativeness associated to them; on such open pole there can be holes for blocking the above said fastening means through pins or screws (FIG. 6).

The intermediate poles PI are apt at supporting the carrying wires FF and, to such purpose, they comprise seats 4 for housing said wires. Preferably, seats 4 are tabs protruding from the outer surface of the pole obtained by its shearing so as to form a sort of hook for said wires FF. Alternatively, the tabs are made by drawing so as they do not protrude from the outer surface of the pole, or of a shaped hole obtained by shearing on the pole itself.

The carrying wires FF are distributed vertically one above the other between said intermediate poles PI. In particular, the carrying wires FF are hooked to the head poles PT by means of the above said hooking means 3 by interposing tensioning means 5. The tensioning means 5 comprise traditional wire stretchers such as those described in the Italian patent application PN20012A000021 or in the international patent application WO2007060225 by the same applicants, therefore they will not be further described.

These carrying wires FF, if necessary, can be movable wires if they are joined to the head wires PT with sliding fastening means and by means of the device described in the patent EP1699286 by the same inventors, in order to facilitate the automation of the trimming phase.

Advantageously, in accordance with the present invention, the device 1 comprises an additional pole PA associated with each of the head poles PT, such pole PA possibly can be also identical to the pole PT. This additional pole PA is firmly joined to the head pole PT by means of a structural element or bar or pipe PR1 placed in correspondence with the respective top ends. Moreover, it, too, is driven into the ground in a vertical position and upstream the row of plants, in other words, as first element of the device 1 aligned along the row of grape vines. In the lower end of the above mentioned poles and possibly also below the ground level, there can be provided a second structural element, or bar or pipe PR2 as a connecting element always with said head pole PT placed in correspondence with the relative lower ends in order to form only one rigid body so as to withstand the force exerted by the row of plants and by the vegetation and so as to avoid the anchor positioning. The presence of said second structural element PR2 and/or of the anchor will depend upon, for example, the nature of the soil and upon the quantity of vegetation that leans and pushes against the supporting trellis of the row of plants. If the soil is hard enough and/or compact, it will suffice the use of only the first structural element PR1.

Further, the pole PA has preferably but not necessarily a cylindrical section, it can have a polygonal section and an open section and possibly it can be identical to the head pole PT, it is preferably hollow and formed of a metallic material such as stainless or galvanized steel.

From the foregoing it is apparent that the device 1 comprises a quadrilateral structure Q with right angles capable of supporting the tension of the whole vineyard structure without having the necessity of anchoring elements of the traditional type (anchors or plates). Furthermore, such structure Q acts, at the same time, also as windbracing, hence avoiding the positioning of the head pole inclined in the opposite direction with regard to the direction of growth the row of plants.

The device 1 for fastening and adjusting the carrying wires on a row of plants according to the present invention advantageously comprises, in addition, shifting means MS of the containment wires FM as it can be seen from the figures. The shifting means can be, for example, a reel 6 directly mounted in a slidable way onto the outer surface of the additional pole PA. In particular, the reel 6 slidably engages the portion of the outer surface of the pole PA facing the opposed direction with respect to that of the growth of the row of plants. As shown in the figures, more reels can be mounted for each pole PA.

Therefore, the ends of the reel 6 protrude with respect to the section of the pole PA and each one connects to a corresponding tensioning device 7 for a mobile wire FM. In other words, each reel 6 is connected to a pair of tensioning devices 7 apt at tensioning each of the two containment wires FM. In this way, along a horizontal line, the reels 6 carry two containment wires FM parallel and spaced apart which define a containment space of the plant sprouts.

In this way, the reels 6 are free to slide along the entire height of the pole PA, that advantageously acts as a guide means to enable the positioning of the containment wires FM basically along the entire height of the pole PA, that is of the vertical development of the vine sprouts.

The tensioning device 7 is a traditional device such as, for example, the device described in patent EP 1699286 by Mollificio Bortolussi S.r.l.

With reference to figures from 1 to 5, it will be now described the functioning of the device according to the invention. Synthetically, the installing of the device 1 comprises:

a) providing a pair of head poles PT;
b) driving said pair of head poles PT in vertical position into the ground at a predetermined distance;
c) driving into the ground in vertical position an additional pole PA, which can be identical to the head pole PT, near each pole of said pair of head poles PT so as to have it aligned with said pair of head poles PT and so that it faces in the opposite direction with respect to said pair of head poles PT;
d) connecting each head pole PT with the corresponding additional pole PA by means of a first structural element PR1 at the top end of said head pole and additional pole, and possibly by means of a second structural element PR2 at the lower ends of said head pole and additional pole above or below the ground level;
e) driving into the ground a plurality intermediate poles PI to support the carrying wires FF;
f) stretching horizontally a plurality of carrying wires FF (that can become movable) between said head poles and fastening them to said plurality of intermediate poles PI;
g) connecting between two additional poles PA at least one pair of containment wires FM aligned horizontally and spaced at a predetermined distance by means of a reel or sliding block 6 running along said additional poles;
h) positioning said at least one pair of second containment wires FM below the vegetative plant shoot;
i) allowing the sprouts of said vines to grow from said shoot so that they reach over said at least one pair of containment wires FM;
j) moving upward said at least one pair of containment wires FM so as to support and contain said sprouts.

Figure 1A:
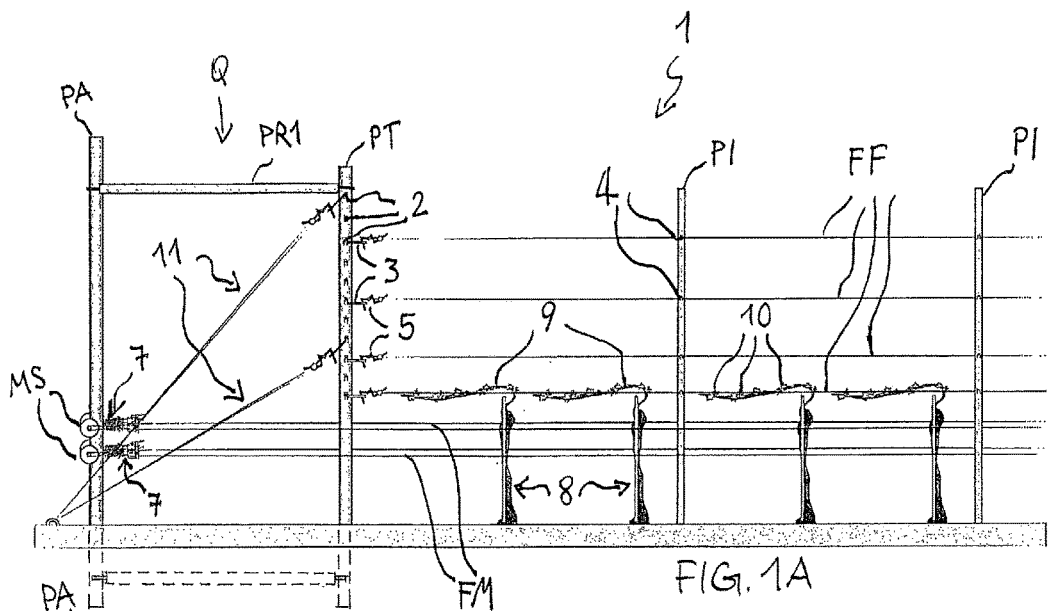
FIG. 1A is a schematic front view of a head portion of a row of plants in a first condition, according to the present invention.
Figure 2A:
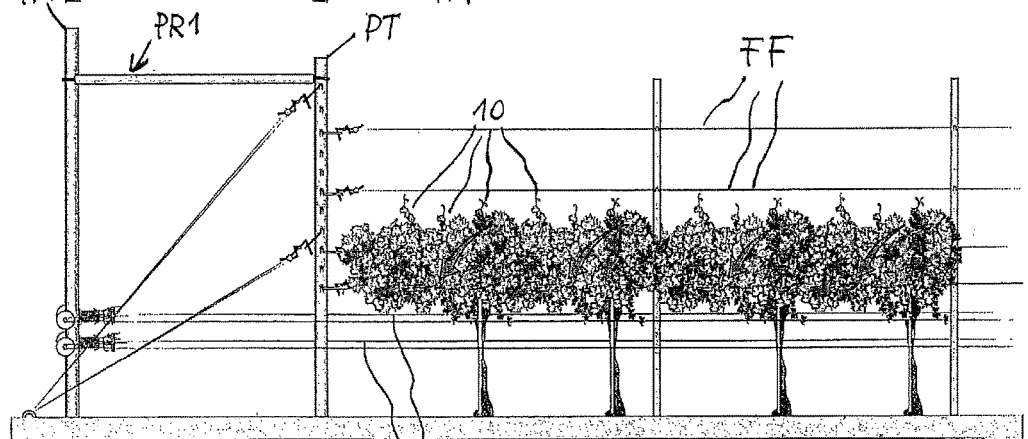
FIG. 2A is a schematic front view of the row of plants of FIG. 1A in a second condition.
Figure 1B:
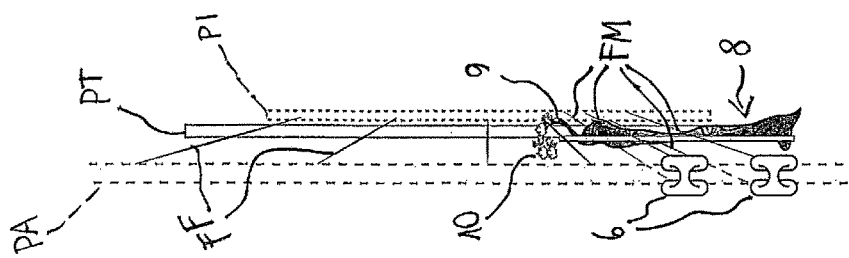
FIG. 1B is a schematic side view, that is aligned, of the row of plants of FIG. 1A.

In particular, in a first condition with reference to FIGS. 1A and 1B, and that is when the vine 8 of the row of vines is at the beginning of its vegetative phase, the shoots 9 are still basically leafless, in other words, they start to outline the annual vegetative portions or sprouts 10 designated to the growth of the leaves, tendrils and fruits. In this situation, the containment wires FM are below the shoots 9 themselves as for the time being they do not have a particular function.

Afterwards, during a first vegetative phase when the shoots generate the sprouts 10 whose length is higher than the first carrying wires FF, that is the wires positioned nearer to the ground (FIGS. 2A and 2B), the same sprouts 10 tend to bend towards the ground due to their own weight (arrows downwards).

Figure 3A:
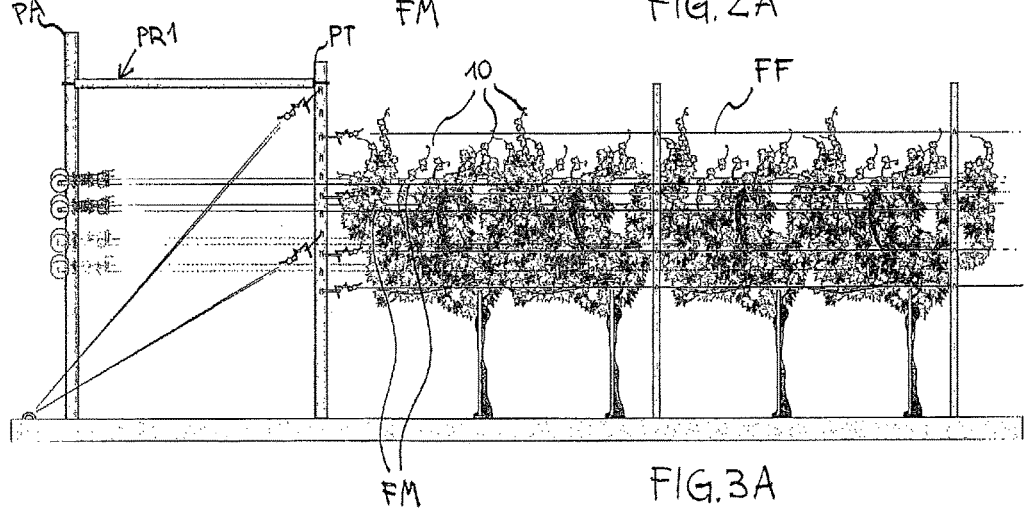
FIG. 3A is a schematic front view of the row of plants of FIG. 1A in a third condition.
Figure 3B:
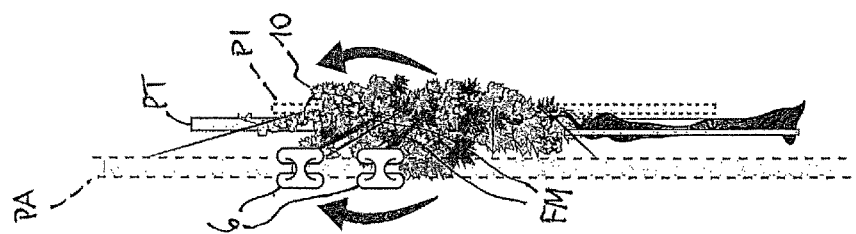
FIG. 3B is a schematic side view, that is aligned, of the row of plants of FIG. 3A.
Figure 2B:
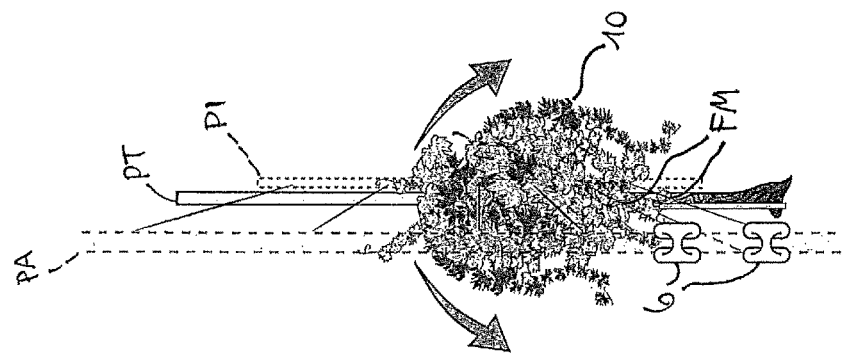
FIG. 2B is a schematic side view, that is aligned, of the row of plants of FIG. 2A.

At this point, as shown in FIGS. 3A and 3B, the reels or blocking means 6 are made run upwards. This movement entails accompanying the sprouts 10 upwards, towards the carrying wires FF placed above the first carrying wires FF nearer to the ground. Practically, the containment space defined by the pair of containment wires FM previously described is moved upwards so as to receive and accompany the sprout end portion which has bent downwards while growing due to its own weight. In particular, preferably two pairs of containment wires are made slide upwards, one after the other.

Figure 5B:
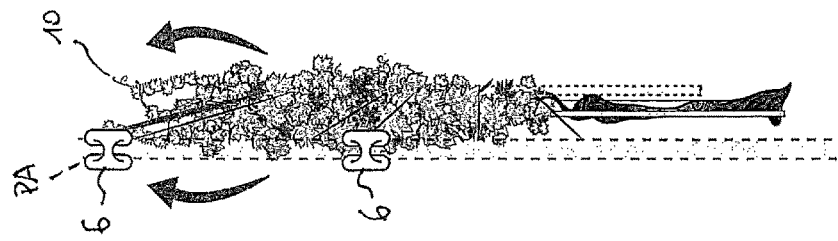
FIG. 5B is a schematic side view, that is aligned, of the row of plants of FIG. 5A.
Figure 4B:
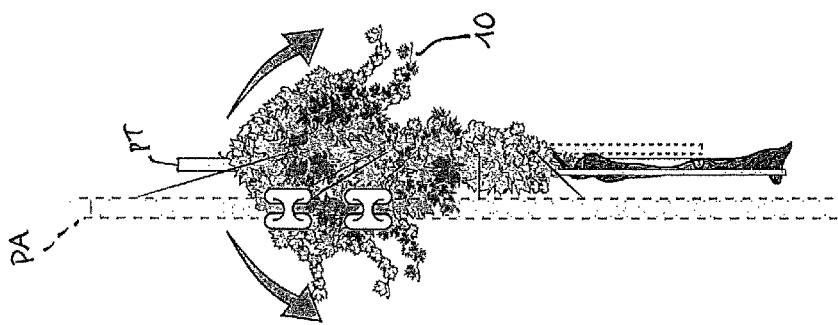
FIG. 4B is a schematic side view, that is aligned, of the row of plants of FIG. 4A.
Figure 4A:
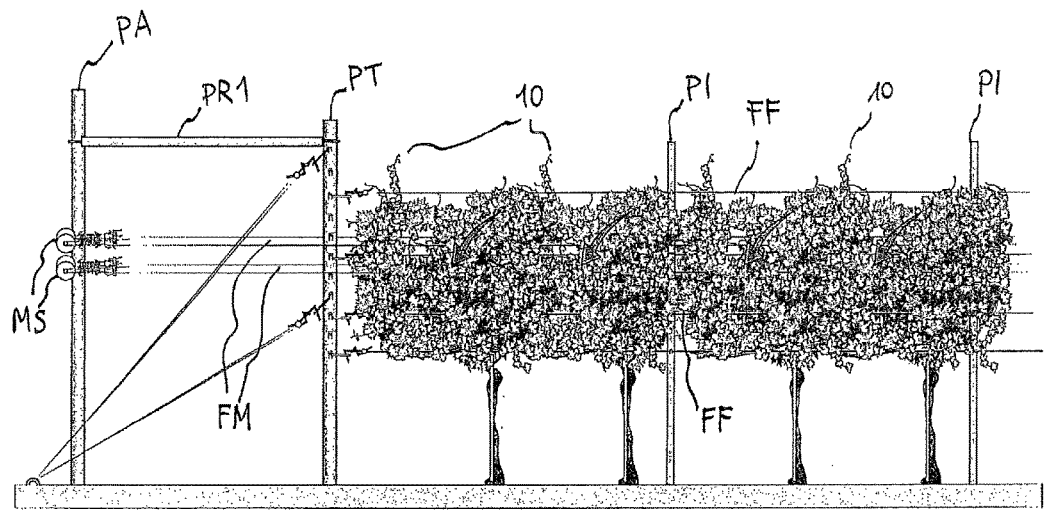
FIG. 4A is a schematic front view of the row of plants of FIG. 1A in a fourth condition.
Figure 5A:
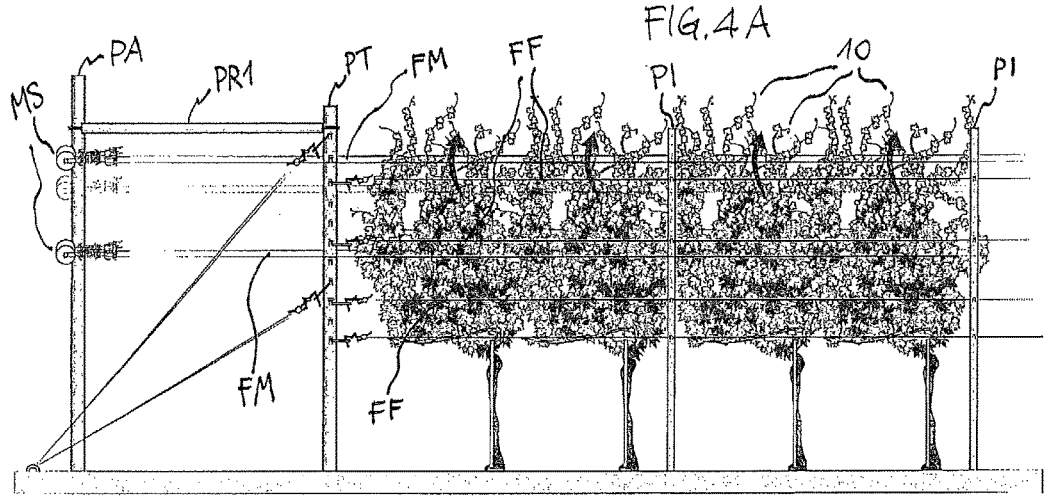
FIG. 5A is a schematic front view of the row of plants of FIG. 1 in a fifth condition.

Then, as shown in FIGS. 4A and 4B, when the sprouts 10, while growing, again tend to bend downwards climbing over the containment wires FM which had been moved upwards, the pair of containment wires FM placed higher with respect to the two pairs of containment wires is further moved upwards by means of the sliding of the corresponding reel 6. As in the foregoing, then, the distal portion of the sprouts is accompanied and contained in the space defined by the pair of higher containment wires FM (FIGS. 5A and 5B).

From the foregoing, it is apparent that through a very simple structure a lot of inconveniences connected with the prior art have been solved and important advantages have been reached.

During the automated trimming phase, by means of the above said structure or device, it is possible to move both the carrying wires FF, which can also be movable, and the containment wires FM used in order to contain and organize the vegetation and the sprouts during their growth.

In the stretch going from the head pole to the first intermediate pole there are no more obstructions from the guides which would not allow the grape harvest machines to work correctly.

The limitations coming from the guides are completely overcome as they can be eliminated using an additional pole acting as a guide itself.

The quadrilateral structure Q makes it possible to avoid installing the head poles obliquely, more burdensome with respect to the vertical installation, and it makes it possible to eliminate the anchors or plates embedded into the ground. In fact, said structure is very resistant both in order to anchor and to brace the head poles. Moreover, advantageously, it can be gained space between the head pole and the additional pole to plant additional plants.

The sliding system of the wires by means of reels or above said fastening devices directly on a pole makes it possible to use basically the entire development height of the plant.

The device for fastening and adjusting the carrying wires on a row of plants according to the present invention is susceptible of modifications and variants easily applied by the skilled in the art without thereby going beyond the scope of the protection as defined by the appended claims.

In order to increase the stability of the device 1 it is possible, in case, to install tension rods which can start from different positions in the head pole PT and be anchored at the base of the additional pole PA.

Further, if it necessary to provide an exceptional stability of the device 1 it is possible to use traditional anchoring systems 11 to the ground.

The invention claimed is:

1. Device for fastening and adjusting carrying wires on a row of plants, the device comprising for each row a pair of head poles and a plurality of intermediate poles, the carrying wires that are fixed or movable and movable containment wires being tensioned between the pair of head poles and the plurality of intermediate poles, said containment wires and said carrying wires being movable in a vertical direction, wherein each head pole is embedded in the ground in a vertical position and is associated to an additional pole planted in the vertical position such that each head pole extends parallel to the additional pole by means of a first structural element, positioned at top ends of said head pole and of the additional pole, so as to form a rigid structure that withstands a tension of the wires of the row of plants, said head pole and said additional pole having either an open or closed cross section that is cylindrical or polygonal, each additional pole also forming a guide for shifting means to move vertically along an outer surface of an outermost side of the additional pole, the outermost side being outermost in a direction facing away from the head pole, wherein said containment wires are connected to the shifting means, and the guide is aligned along the direction of the row of plants.

2. Device according to claim 1, wherein each head pole and the additional pole are connected through at least one anchoring or bracing wire that is stretched from a predetermined height on the head pole to a base of the additional pole.

3. Device according to claim 2, wherein said shifting means are connected to the containment wires through elastic wire tensioning means.

4. Device according to claim 3, wherein said shifting means consist of a pair of rollers or sliding blocks that run directly along said additional pole with a rolling or sliding or slipping action guided in an axial direction.

5. Device according to claim 1, wherein each head pole is associated to the additional pole also by means of a second structural element positioned at lower ends of the head pole and the additional pole embedded in the ground.

6. Device according to claim 1, wherein the additional pole forms the guide for the shifting means to move along an entire length of the additional pole.

7. Method of installing the device according to claim 1, comprising the steps of:
 a) providing said pair of head poles;
 b) driving said pair of head poles in the vertical position into the ground at a predetermined distance;
 c) driving into the ground in the vertical position said additional pole near each pole of said pair of head poles so as to have said additional pole aligned with said pair of head poles and so that the additional poles face each other along the direction of the row of plants;
 d) connecting each head pole with the additional pole by means of the first structural element at the top ends of said head pole and said additional pole;
 e) driving into the ground the plurality of intermediate poles to support the carrying wires;
 f) stretching horizontally the carrying wires between said head poles and fastening the carrying wires to said plurality of intermediate poles;
 g) connecting between two additional poles at least one pair of containment wires aligned horizontally and spaced from each other at another predetermined distance by means of a reel or sliding block running along said two additional poles;
 h) positioning said at least one pair of second containment wires below a vegetative shoot;
 i) allowing sprouts of vines to grow from said vegetative shoot so that said sprouts reach over said at least one pair of containment wires;
 j) moving upward said at least one pair of containment wires so as to support and contain said sprouts.

8. Method according to claim 7, wherein each head pole is connected to the additional pole by means of a second structural element at lower ends of the head pole and the additional pole above or below ground level.

* * * * *